United States Patent
Hironaka et al.

(10) Patent No.: US 7,730,516 B2
(45) Date of Patent: Jun. 1, 2010

(54) TV-CENTRIC SYSTEM

(75) Inventors: Takashi Hironaka, San Diego, CA (US); Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 462 days.

(21) Appl. No.: 11/711,300

(22) Filed: Feb. 27, 2007

(65) Prior Publication Data

US 2008/0209500 A1 Aug. 28, 2008

(51) Int. Cl.
*H04N 7/16* (2006.01)

(52) U.S. Cl. ............... 725/141; 725/139; 725/140; 725/151; 725/152; 725/153

(58) Field of Classification Search ......... 725/139–141, 725/151–153
See application file for complete search history.

(56) References Cited

U.S. PATENT DOCUMENTS

| | | | |
|---|---|---|---|
| 4,071,383 A | 1/1978 | Nagata et al. | |
| 4,548,688 A | 10/1985 | Matthews | |
| 4,880,493 A | 11/1989 | Ashby | |
| 5,122,440 A | 6/1992 | Chien | |
| 5,532,504 A | 7/1996 | Tabata et al. | |
| 5,538,758 A | 7/1996 | Beach | |
| 5,711,987 A | 1/1998 | Bearinger | |
| 5,846,375 A | 12/1998 | Gilchrist et al. | |
| 5,863,327 A | 1/1999 | Thakur | |
| 6,090,723 A | 7/2000 | Thakur et al. | |
| 6,284,050 B1 | 9/2001 | Shi et al. | |
| 6,326,670 B1 | 12/2001 | Nishiyama | |
| 6,378,006 B1 * | 4/2002 | Murata | 719/321 |
| 6,607,991 B1 | 8/2003 | Livesay et al. | |
| 6,943,110 B1 | 9/2005 | Lur et al. | |
| 2001/0035131 A1 | 11/2001 | Sakuma | |
| 2002/0147771 A1 | 10/2002 | Traversat et al. | 709/203 |
| 2004/0017997 A1 * | 1/2004 | Cowgill | 386/65 |
| 2004/0088718 A1 * | 5/2004 | Sprague | 719/322 |
| 2004/0117788 A1 * | 6/2004 | Karaoguz et al. | 717/177 |
| 2005/0076127 A1 * | 4/2005 | Wilson et al. | 709/227 |
| 2005/0114900 A1 * | 5/2005 | Ladd et al. | 725/100 |
| 2005/0272228 A1 | 12/2005 | Ito et al. | |
| 2005/0289531 A1 | 12/2005 | Illowsky et al. | 717/163 |
| 2006/0026305 A1 | 2/2006 | Illowsky et al. | 710/8 |
| 2006/0026637 A1 * | 2/2006 | Gatto et al. | 725/37 |
| 2006/0070080 A1 * | 3/2006 | Takahashi et al. | 719/315 |
| 2006/0080408 A1 * | 4/2006 | Istvan et al. | 709/219 |
| 2006/0136978 A1 * | 6/2006 | Chou et al. | 725/133 |
| 2008/0115189 A1 * | 5/2008 | Lejeune | 725/141 |
| 2008/0120682 A1 * | 5/2008 | Hardacker | 725/141 |
| 2008/0120683 A1 * | 5/2008 | Frazier et al. | 725/141 |
| 2008/0229370 A1 * | 9/2008 | Zustak et al. | 725/78 |

FOREIGN PATENT DOCUMENTS

| | | |
|---|---|---|
| EP | 1326271 | 7/2003 |
| JP | 09082696 A | 3/1997 |
| JP | 2004-193368 A | 7/2004 |
| JP | 2004-311827 A | 11/2004 |
| WO | 2005/067210 A1 | 7/2005 |
| WO | WO 2005/067210 A1 | 7/2005 |

* cited by examiner

*Primary Examiner*—Christopher Kelley
*Assistant Examiner*—Mulugeta Mengesha
(74) *Attorney, Agent, or Firm*—John L. Rogitz

(57) ABSTRACT

A method for abstracting a TV hardware component to a service class to facilitate providing services through a TV.

21 Claims, 2 Drawing Sheets

SERVICE CLASS MODEL CONSTRUCTION

OPERATION

TV-CENTRIC SYSTEM

FIELD OF THE INVENTION

The present invention relates generally to TV-centric home entertainments systems.

BACKGROUND OF THE INVENTION

Leading edge digital televisions (DTVs) typically include one or more digital devices that are connected together to create the TV electronics. These various devices may include CPUs, tuners, demodulators, USB ports, storage devices, transcoders, scalers, deinterlacers, and so on. Each device usually includes its own software control program referred to as a device driver. The DTV's main CPU must communicate with the devices through their device drivers. The software control program that comprises the device driver is executed on the CPU of the DTV, and ordinarily is included in the main program store on the DTV.

As understood herein, as DTV technology advances, functions that previously only existed in chips external to the TV's main CPU chip are newly incorporated within next generation chips. This creates a challenge in maintaining a consistent software interface to the hardware that implements the desired function. In addition, while TVs have not generally been upgradeable devices, some new TV technology functions may be seen as too expensive or too speculative to include in all DTVs, and hence are added only as aftermarket modules. Such modules may include pre-recorded disk drives (such as DVD or Blu-ray), hard disk storage, TCP/IP networking, and tuning of new services (such as cable or satellite TV). Providing a consistent development interface to DTV engineers as well as a consistent user interface for the consumer on the DTV are challenges in this environment. This includes providing ways for the DTV to access functions that a new module provides, as well as providing a way for an added module to access functions that the DTV provides.

The present invention is directed at these problems.

SUMMARY OF THE INVENTION

A system has a TV including a TV processor and a display. The system also has a data storage device that is separate from the TV and that communicates with the TV processor. The data storage device includes an associated software driver stored in the TV. With this combination of structure a requesting component can use a storage service provided by the storage device by means of the software driver in the TV.

The data storage device may be a bare DVD player without an internal device driver, or a hard disk drive or flash memory card, or other component or device. For example, the data storage device may be a TV tuner and/or demodulator with storage capability, a video or still camera with storage capability, a network connection to storage, an audio player, a wireless telephone, a camcorder, a personal video recorder (PVR), or a video cassette recorder (VCR).

The data storage device can be abstracted in the system as a service, and a requesting component can communicate with the TV to request the service to transfer data with the data storage device. In some embodiments the requesting component can communicate with the data storage device only through the TV processor.

In another aspect, a method is disclosed for abstracting a TV hardware component to a service class to facilitate providing services through a TV. For at least one TV hardware component separate from a TV and configured to communicate therewith, a respective service class is defined. For the service class, a message interface and a hook for accessing a data structure in the component are defined. Then, the service class is provided to the TV such that the TV can provide services associated with the component to devices communicating with the TV and separate therefrom.

In yet another aspect, a method for providing services through a TV includes registering a first device associated with a service with the TV, registering a second device with the TV, and then allowing the second device to request from the TV the service, with the TV accessing the first device as required to provide the service and with the first and second devices being external to the TV.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
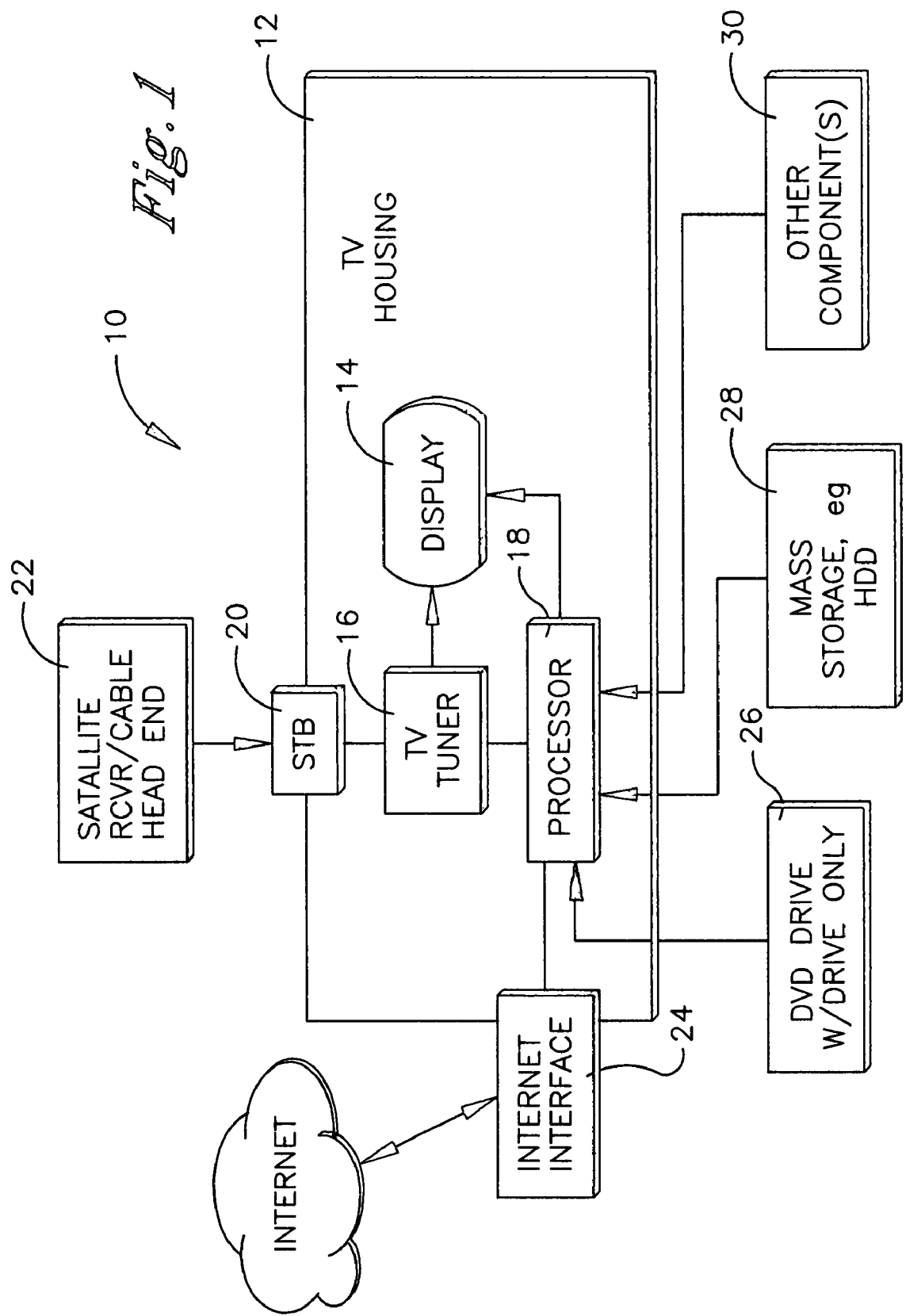
FIG. 1 is a block diagram of a non-limiting TV-centric system in accordance with the invention.

Referring initially to FIG. 1, a system is shown, generally designated 10, which includes a TV housing 12 holding TV components including a TV display 14, a TV tuner 16, and a TV processor 18. The TV tuner 16 may receive input from a set-top box (STB) 20 that, as indicated in FIG. 1, can be part of the housing 12 or alternatively can be in a housing separate from the housing 12. In any case, the STB 20 receives TV signals from one or more sources 22 such as but not limited to satellite receivers, cable system head ends, broadcast receiver antennae, etc. Depending on the nature of the signal, it may be sent directly to the display 14 from the tuner 16 or sent first through the processor 18 for subsequent display.

The non-limiting embodiment shown in FIG. 1 illustrates that the present TV can be connected to a plurality of external systems and networks. In one embodiment the processor 18 may communicate with an Internet interface 24 such as but not limited to a computer modem. The modem 24 may be connected to the Internet, so that the TV processor 18 can communicate with a web-based system server for purposes to be shortly disclosed.

In one embodiment, the TV processor 18 may communicate with a DVD player 26. The DVD player 26 may be a "bare" DVD player that has only an optical disk drive proper but not a high level software driver. Also, the processor 18 may communicate with a mass storage 28, which may be implemented by a PVR. Information including multimedia streams such as TV programs and movies can be exchanged between the TV processor 18 and the DVD player 26 and storage 28. Other non-limiting storage devices include a TV tuner and/or demodulator with storage capability, a video or still camera with storage capability, a network connection to storage, an audio player, a wireless telephone, a camcorder, a personal video recorder (PVR), or a video cassette recorder (VCR).

As set forth further below, the TV processor 18 may also communicate with one or more other components 30 for providing the other components 30 with services implemented using the DVD player 26 and/or mass storage 28 in accordance with logic below. In general, the components 26/28/30 may use each others' services by means of the TV.

Figure 2:
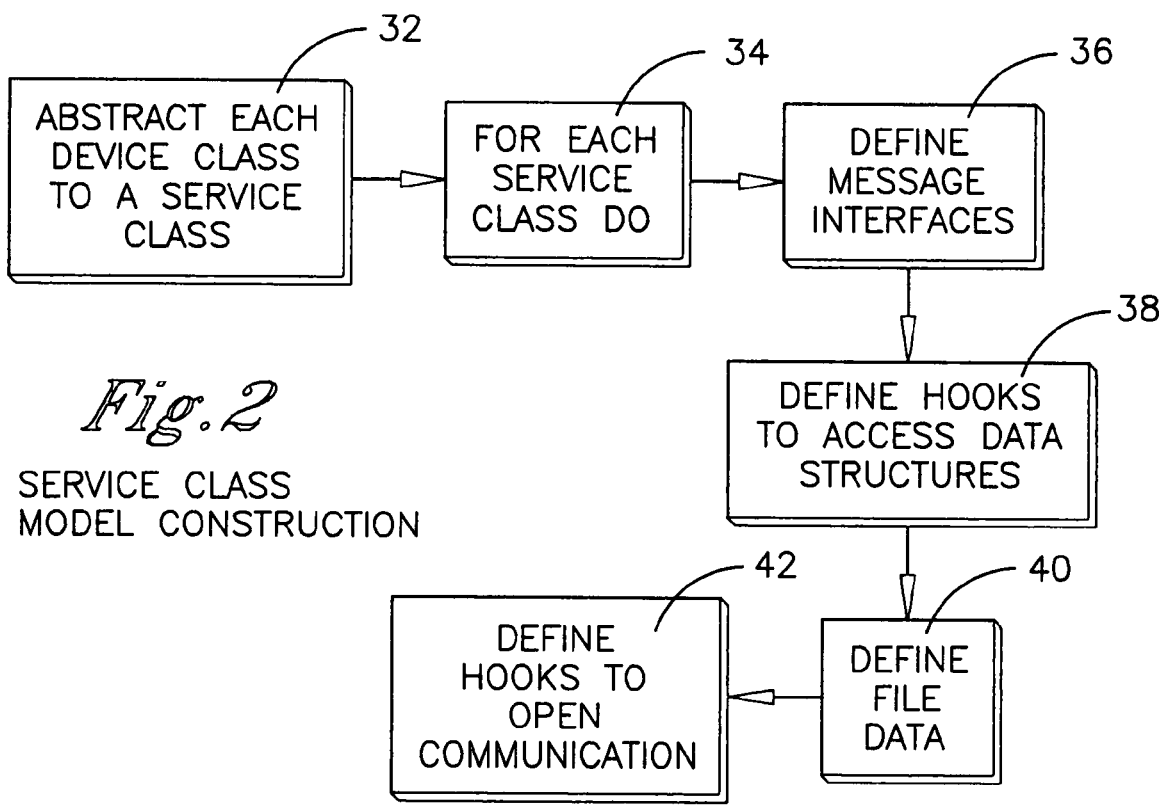
FIG. 2 is a flow chart of non-limiting service class model definition logic.

Accordingly and now turning to FIG. 2 for greater explanation, at block 32 each device class is abstracted to a service class. That is, the device class to which the bare DVD drive 26 shown in FIG. 1 belongs is abstracted to a service class that might be thought of as "provide an audio-video stream from an optical disk", whereas the device class to which the mass storage device 28 shown in FIG. 1 belongs is abstracted to a service class that might be thought of as "provide mass storage", and so on.

As part of this abstraction, at block 34 for each service class the logic may move to block 36 to define message interfaces with the particular service class. Moreover, at block 38 hooks to access data structures in the service class, e.g., file system hooks, may be defined. Also, at block 40 the data structures of the service class and their data types, e.g., file data, may be defined. Block 42 indicates that hooks may be defined for the particular service class to, e.g., open communications such as interaction with the service.

Figure 3:
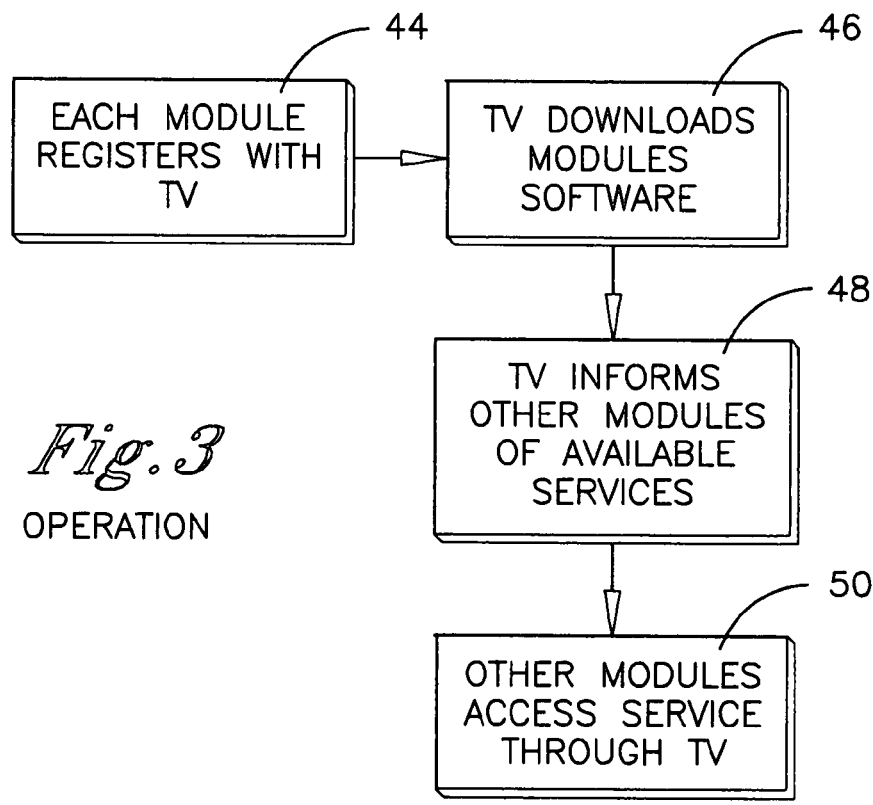
FIG. 3 is a flow chart of non-limiting operating logic used by the system shown in FIG. 1.

FIG. 3 illustrates how the service class abstractions generated using FIG. 2 may be used in operating the system 10 shown in FIG. 1. Commencing at block 44, each module, e.g., the modules 26, 28, 30, registers itself with the TV processor 18. This registration can include informing the TV 18 of the device/service classes of the module. Or, the TV processor 18 can discover the classes of each module by interrogating each new module as a connection is sensed by the processor.

The TV processor 18 then determines whether necessary software (such as device drivers) to exploit the service represented by a newly registered module is available to the processor 18, preferably by being stored in electronic storage such as flash memory, RAM, ROM, disk storage, and so on within the TV housing 12. Alternatively, the necessary software may be provided by or located within the newly registered module itself. Alternatively, the TV processor 18 may elect to store necessary software using a storage service such as that provided by the mass storage 28. In any case, if the software necessary to exploit a service of a newly registered module is not available, the TV processor 18 can automatically download it from, e.g., the Internet at block 46, without user interaction if desired. The TV can also periodically check for software updates, so that upgrades can be made to the devices 26, 28, 30 simply by providing upgraded software to the TV without requiring hardware replacement.

Also, if desired, at block 48 the TV processor 18 may inform other modules with which it communicates of the added presence of a new service. For example, if the DVD player 26 is already registered when the mass storage device 28 is connected to the TV, the TV processor 18, after ensuring that the TV possesses the necessary software to exploit the mass storage service provided by the storage device 28, can inform the DVD player 26 of the newly available mass storage service provided by the mass storage device 28. Then, at block 50 the DVD player 26 can avail itself of the mass storage service provided by the mass storage device 28 by requesting the service from the TV. In essence, the TV processor 18 acts as broker between the player 26 and device 28, i.e., the TV processor 18 may be accessed by a first component as a proxy for the service provided by a second component. In the hypothetical wherein the DVD player 26 requests from the TV processor 18 the service provided by the mass storage device 28, the TV processor 18 accesses the mass storage device 28 as required to provide the requested service to the DVD player 26.

While the particular TV-CENTRIC SYSTEM is herein shown and described in detail, it is to be understood that the subject matter which is encompassed by the present invention is limited only by the claims.

What is claimed is:

1. A system, comprising:
   a TV including a TV processor and a display; and
   a data storage device separate from the TV and communicating with the TV processor, the data storage device requiring, to access data therein, an associated software driver stored in the TV but not in the data storage device, wherein, in response to the TV receiving, from a requesting component separate from the TV, a request to use a storage service provided by the storage device by means of the software driver in the TV, the TV acts as a proxy to provide the storage service to the requesting component by using the software driver in the TV to access the storage device and provide the storage service to the requesting component.

2. The system of claim 1, wherein the data storage device is abstracted in the system as a service, and a requesting component communicates with the TV requesting the service to transfer data with the data storage device.

3. The system of claim 1, wherein the data storage device is abstracted in the system as a service, and a requesting component communicates with the TV requesting the service to transfer data with the data storage device.

4. The system of claim 1, wherein the requesting component can communicate with the data storage device only through the TV processor.

5. A method for abstracting a TV hardware component to a service class to facilitate providing services through a TV, comprising:
   for at least one TV hardware component separate from a TV and configured to communicate therewith, defining a respective service class;
   for the service class, defining at least:
      one message interface; and
      one hook for accessing a data structure in the component; and
   providing the service class to the TV such that the TV can provide services associated with the component to devices communicating with the TV and separate therefrom, wherein the TV informs the devices communicating with the TV and separate therefrom of the added presence of the service class associated with the TV hardware component, the TV responding to requests from the devices communicating with the TV and separate therefrom to use the service class by using the message interface and hook to access the data structure in the component as a proxy for a requesting device communicating with the TV and separate therefrom.

6. The method of claim 5, further comprising, for the service class, defining at least one hook for opening a communication path.

7. A method for providing services through a TV, comprising:
   registering a first device associated with a service with the TV, the first device being separate from the TV;
   registering a second device with the TV, the second device being separate from the TV; and
   allowing the second device to request from the TV the service, with the TV accessing a device driver in the TV and associated with the first device, then accessing, using the device driver, the first device as required to provide the service to the second device as a proxy therefor, the first and second devices being external to the TV, wherein the TV determines whether it possesses software necessary to provide the service and if not, the TV downloads the software.

8. The method of claim 7, comprising:
for at least the first device, defining a respective service class;
for the service class, defining at least:
one message interface; and
one hook for accessing a data structure in the component; and
providing the service class to the TV such that the TV can provide services associated with the first device.

9. The method of claim 8, further comprising, for the service class, defining at least one hook for opening a communication path.

10. The method of claim 7, wherein the first device is a bare DVD player without an internal device driver.

11. The method of claim 7, wherein the first device is a hard disk drive.

12. The method of claim 7, wherein the first device is a tuner and/or demodulator.

13. The method of claim 7, wherein the first device is a video camera.

14. The method of claim 7, wherein the first device is a still camera.

15. The method of claim 7, wherein the first device is a network connection.

16. The method of claim 7, wherein the first device is an audio player.

17. The method of claim 7, wherein the first device is a wireless telephone.

18. The method of claim 7, wherein the first device is a camcorder.

19. The method of claim 7, wherein the first device is a personal video recorder (PVR).

20. The method of claim 7, wherein the first device is a video camera recorder (VCR).

21. The method of claim 7, wherein a requesting component can communicate with the first device only through the TV.

* * * * *